United States Patent
Morita

[11] Patent Number: 6,088,200
[45] Date of Patent: Jul. 11, 2000

[54] MAGNETIC DISC AND MAGNETIC DISC DRIVE

[75] Inventor: Osamu Morita, Miyagi, Japan

[73] Assignee: Sony Corporation, Tokyo, Japan

[21] Appl. No.: 09/199,307

[22] Filed: Nov. 25, 1998

[30] Foreign Application Priority Data

Nov. 27, 1997 [JP] Japan .................................. 9-326639

[51] Int. Cl.[7] .................................................. G11B 5/82
[52] U.S. Cl. ............................................................ 360/135
[58] Field of Search ..................................... 360/135, 133

[56] References Cited

U.S. PATENT DOCUMENTS

| | | | |
|---|---|---|---|
| 5,258,973 | 11/1993 | Iida ........................ | 369/275.2 |
| 5,285,343 | 2/1994 | Tanaka et al. ............ | 360/131 |
| 5,504,646 | 4/1996 | Tanaka et al. ............ | 360/135 |
| 5,548,454 | 8/1996 | Kawakubo et al. ....... | 360/72.1 |
| 5,585,989 | 12/1996 | Kuromiya et al. ........ | 360/135 |
| 5,590,009 | 12/1996 | Ishida ....................... | 360/135 |
| 5,723,033 | 3/1998 | Weiss ....................... | 204/192.15 |
| 5,748,421 | 5/1998 | Taki et al. ................. | 360/135 |
| 5,766,718 | 6/1998 | Matsuda et al. .......... | 428/65.3 |
| 5,828,536 | 10/1998 | Morita ...................... | 360/135 |
| 5,875,083 | 2/1999 | Oniki et al. ............... | 360/135 |

FOREIGN PATENT DOCUMENTS

| | | |
|---|---|---|
| 60-109018 | 6/1985 | Japan . |
| 4-103023 | 4/1992 | Japan . |
| 5-174515 | 7/1993 | Japan . |
| 7-065363 | 3/1995 | Japan . |

*Primary Examiner*—William Klimowicz
*Attorney, Agent, or Firm*—Hill & Simpson

[57] ABSTRACT

Recording into and reproduction from the magnetic disc 3 is done a magnetic head installed on a head slider of which at least a portion is floated during the recording/reproduction. On the magnetic disc 3, there are formed a data zone 3a consisting of groove-like grooves $3a_2$ are formed along the recording track and lands $3a_1$ formed between the grooves $3a_2$ and on which an information signal is recorded, and a servo zone 3b to record control signals and consisting of grooves $3b_2$ and lands $3b_1$ corresponding to control signals including a servo signal and magnetized to have opposite polarities. In the servo zone 3b, the lands $3b_1$ are larger in area than the grooves $3b_2$. Such structure provides for a more stabilized fly height for the head slider.

8 Claims, 17 Drawing Sheets

MAGNETIC DISC AND MAGNETIC DISC DRIVE

BACKGROUND OF THE INVENTION

1. Field of the Invention

The present invention relates to a magnetic disc into and/or from which an information is written and/or read by a magnetic head installed on a head slider, and a magnetic disc drive in which the magnetic disc is usable.

2. Description of Related Art

Conventionally, the conventional magnetic disc used in the magnetic disc drive has a magnetic film formed on either side of the magnetic disc to cover the entire disc surface. To suppress a cross-talk from neighboring tracks, the guard band between the recording tracks has to be wider. Thus, in the conventional magnetic disc, it is difficult to form the tracks at a reduced pitch, Therefore, the conventional magnetic disc cannot be designed more compact and to have a larger storage capacity.

To overcome the above drawbacks of the conventional magnetic disc, the Applicant of the present invention proposed an improved magnetic disc and a magnetic disc drive in which the magnetic disc is usable (in the Japanese patent application laid open as a Provisional Publication No. 259709/'94).

The magnetic disc disclosed in this Japanese patent application laid open as a Provisional Publication No. 259709/'94 has a zone in which information is recorded (will be referred to as "data zone" hereinunder) and a zone in which control signals including servo signal are recorded (will be referred to as "servo zone" hereinunder).

Referring now to FIG. 1, there is schematically illustrated the above-mentioned magnetic disc, generally indicated with a reference 200, having data zones 300 in which lands 300a are formed as data recording tracks and a groove 300b is formed as a guard band between two neighboring recording tracks.

As shown in FIG. 1, the magnetic disc has also a servo zone 400 formed from lands 400a (will be referred to as "servo pits" hereinunder) corresponding to a control signal such as servo signal, etc. In the servo zone 400, the lands 400a are magnetized to have one polarity and the grooves 400b are magnetized to have an opposite polarity, for writing a servo signal before the magnetic disc is used for data recording and reproduction. The grooves 400b provide a reference plane.

The above magnetic disc 200 has guard bands physically formed as grooves in relation to the recording tracks, so cross talk will not easily occur. Therefore, since the guard bands have not to be wider to suppress cross talk, the track pitch may be smaller to have a larger recording capacity of the magnetic disc 200. As the track pitch can be smaller, a more higher density of recording can be attained.

The servo pits 400a, lands, can easily be formed extremely fine and highly accurately in the magnetic disc 200. By pre-forming servo pits correspondingly to a control signal, the control signal can be written into the magnetic disc 400 very accurately.

Namely, since a control signal can be written in a very precise position relative to the recording track, data can easily be recorded on the magnetic disc 200 more densely than in a conventional magnetic disc in which no servo pits are formed.

However, when a head slider is used for data read/write from/into the magnetic disc 200 having such a high recording density, the head slider has to be designed to float about 50 nm or less, for example, in order to minimize the spacing loss.

The variation of floating height must also be smaller because the spacing loss is caused not only by the floatation but also by its variation.

As shown in FIG. 1, however, the servo and data zones 400 and 300 in the magnetic disc 200 in which the above-mentioned servo pits 400a are pre-formed are different in pattern form from each other. Therefore, the head slider floats to a different height in the servo zone 400 from it does in the data zone 300. The difference in floating height from one zone to another causes the head slider to float at various heights, so the magnetic head installed on the head slider cannot stably record and reproduce information signal.

For the magnetic disc 200, a following method has been studied for minimizing the variation of floating height of the head slider in passing over the servo zone to assure a stable information recording and reproduction.

Namely, the pattern in the servo zone is designed, by making the track-directional length of the servo zone smaller than a predetermined value, for example, to minimize the variation of floating height of the head slider passing over the servo zone.

Normally, the pattern in the servo zone is designed for improvement of the accuracy of magnetic head positioning. Thus, the pattern in the servo zone to inhibit the variation of head slider floating can be designed with a limited freedom, resulting in a sacrifice of the accuracy of magnetic head positioning which is the most important.

SUMMARY OF THE INVENTION

Accordingly, the present invention has an object to overcome the above-mentioned drawbacks of the prior art by providing a magnetic disc adapted to more effectively minimize the variation of floating height of the head slider passing over a servo zone thereof, permit a more stable recording and/or reproduction and more suitable to mass produce, and a magnetic disc drive in which the magnetic disc is usable.

The above object can be achieved by providing a magnetic disc recordable and/or reproducible by a magnetic head installed on a head slider designed to float at at least a part thereof owing to a floatation developed by an air flow between the head slider and the surface of the magnetic disc during recording and/or reproduction.

The magnetic disc has on a surface thereof an information recording zone in which groove-like grooves are formed along a recording track and arbitrary information signal is recorded at a land between the lands, and a control signal recording zone in which grooves and lands corresponding to control signals including at least a servo signal are formed and magnetized to have opposite polarities to record the control signals.

More particularly, in the control signal recording zone on the magnetic disc according to the present invention, each land is larger in area than each groove.

Also in the magnetic disc of the present invention, a difference between a quotient resulted from division of a floatation applied to the head slider in the information recording zone by a head slider weight and a quotient resulted from division of a floatation applied to the head slider in the control signal recording zone by the head slider weight should preferably be within a range of −0.05 to +0.05.

Further in the magnetic disc according to the present invention, the control signal recording zone should preferably be formed at a predetermined interval along the recording track and the recording track-directional length of the head slider be larger than the predetermined interval.

In the magnetic disc of the present invention having been described in the foregoing, since the land in the control signal recording zone is larger in area than the groove in the zone, the reduction by the groove of the floatation of the head slider in the control signal recording zone is less so that the variation of head slider floating can be inhibited when the head slider passes over the control signal recording zone.

Also in the magnetic disc of the present invention, since a difference between a quotient resulted from division of a floatation applied to the head slider in the information recording zone by a head slider weight and a quotient resulted from division of a floatation applied to the head slider in the control signal recording zone by the head slider weight is within a range of −0.05 to +0.05, the variation of head slider floating can be minimized.

Further in the magnetic disc according to the present invention, since the control signal recording zone is formed at a predetermined interval along the recording track and the recording track-directional length of the head slider be larger than the predetermined interval, an waveform interference takes place in the variation of floating height of the head slider passing over the control signal recording zone.

The above object can be achieved by providing a magnetic disc drive comprising a magnetic disc, a head slider designed to float at at least a part thereof owing to a floatation developed by an air flow between the head slider and the surface of the magnetic disc during recording and/or reproduction, and a magnetic head installed on the head slider to make recording and/or reproduction into/from the magnetic disc.

In the magnetic disc drive of the present invention, the magnetic disc has on a surface thereof an information recording zone in which groove-like grooves are formed along a recording track and arbitrary information signal is recorded at a land between the lands, and a control signal recording zone in which grooves and lands corresponding to control signals including at least a servo signal are formed and magnetized to have opposite polarities to record the control signals.

More particularly, in the magnetic disc used in the magnetic disc drive of the present invention, the control signal recording zone on the magnetic disc, each land is larger in area than each groove.

Also in the magnetic disc used in the magnetic disc drive according to the present invention, a difference between a quotient resulted from division of a floatation applied to the head slider in the information recording zone by a head slider weight and a quotient resulted from division of a floatation applied to the head slider in the control signal recording zone by the head slider weight should preferably be within a range of −0.05 to +0.05.

Further in the magnetic disc used in the magnetic disc drive according to the present invention, the control signal recording zone should preferably be formed at a predetermined interval along the recording track and the recording track-directional length of the head slider be larger than the predetermined interval.

In the magnetic disc used in the magnetic disc drive according to the present invention, since the land in the control signal recording zone is larger in area than the groove in the zone, the reduction by the groove of the floatation of the head slider in the control signal recording zone is less. Therefore, the variation of head slider floating can be inhibited when the head slider passes over the control signal recording zone.

Also in the magnetic disc used in the magnetic disc drive according to the present invention, since a difference between a quotient resulted from division of a floatation applied to the head slider in the information recording zone by a head slider weight and a quotient resulted from division of a floatation applied to the head slider in the control signal recording zone by the head slider weight is within a range of −0.05 to +0.05, the variation of head slider floating can be minimized.

Further in the magnetic disc used in the magnetic disc drive according to the present invention, since the control signal recording zone is formed at a predetermined interval along the recording track and the recording track-directional length of the head slider be larger than the predetermined interval, an waveform interference takes place in the variation of floating height of the head slider passing over the control signal recording zone.

BRIEF DESCRIPTION OF THE DRAWINGS

These objects and other objects, features and advantages of the present intention will become more apparent from the following detailed description of the present invention when taken in conjunction with the accompanying drawings, of which.

DETAILED DESCRIPTION OF THE PREFERRED EMBODIMENTS

Figure 2:
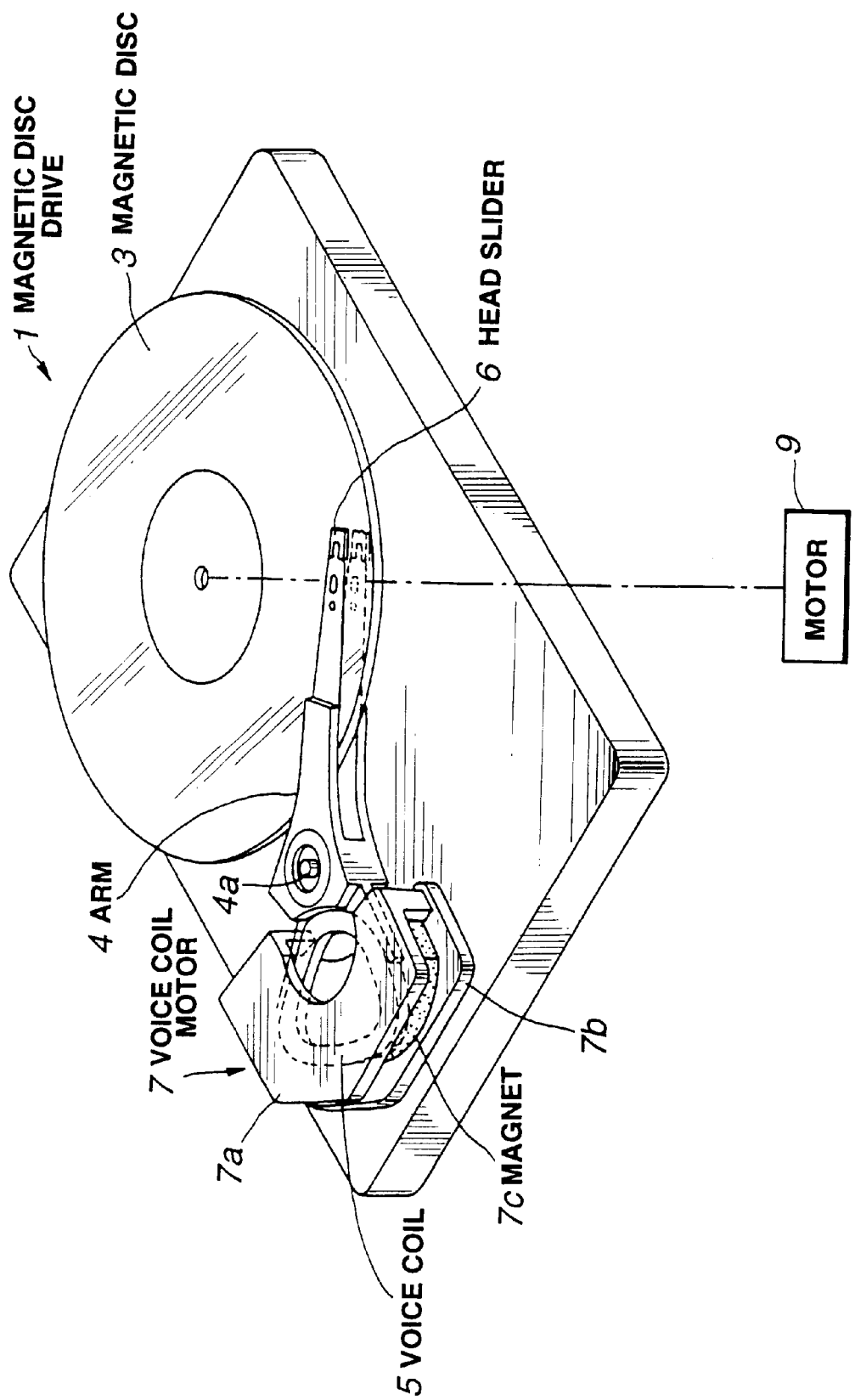
FIG. 2 is a perspective view of an example of the magnetic disc drive according to the present invention.

FIG. 2 is a perspective view of the magnetic disc drive according to the present invention.

The magnetic disc drive is generally indicated with a reference 1. As shown in FIG. 2, the magnetic disc drive 1 comprises a chassis 2 formed from an aluminum alloy or the like, a spindle motor 9 provided behind the flat side of the chassis 2, and a magnetic disc 3 which is to be driven by the spindle motor 9 to spin at a constant angular velocity. Further, the chassis 2 has provided thereon an arm 4 oscillatably about a vertical shaft 4a. The arm 4 has a voice coil motor 7 installed at one end thereof and a head slider 6 installed at the other end.

The voice coil motor 7 consists of a cover yoke 7a, a bottom yoke 7b, a voice coil 5 and a magnet 7c. The voice coil 5 and magnet 7c are disposed between the cover yoke 7a and bottom yoke 7b. The magnet 7c is installed on the bottom yoke 7b.

Figure 3:
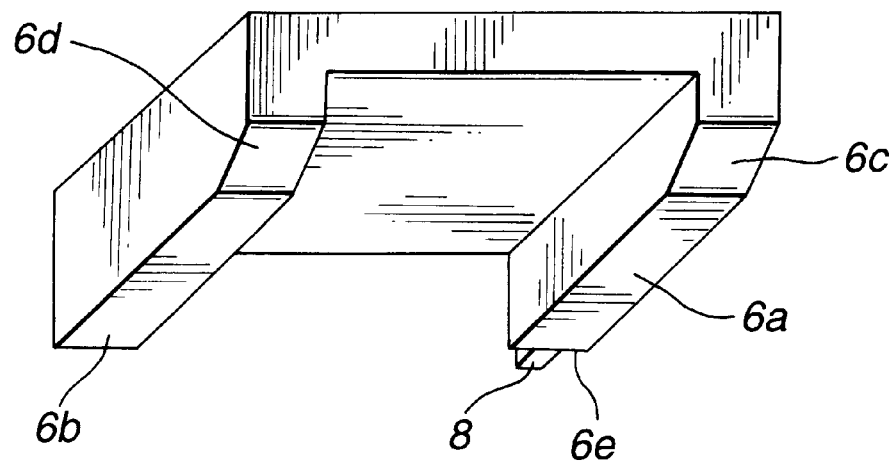
FIG. 3 is a perspective view of an example of the head slider adopted in the magnetic disc drive of the present invention.

Next, the head slider 6 adopted in the magnetic disc drive according to the present invention will be described herebelow concerning its configuration. FIG. 3 is a perspective view showing a magnetic head 8 installed on the head slider 6.

As shown in FIG. 3, the head slider 6 has formed at both lower sides thereof rails 6a and 6b serving as air bearing surface. The rails 6a and 6b have tapered portions 6c and 6d, respectively, formed by cutting the ends of the respective rails 6a and 6b. Air is admitted at the tapered portions 6c and 6b.

Also the head slider 6 has provided at one end 6e opposite to the tapered portion 6c of the rail 6a the magnetic head 8 which records/reproduce information signal.

Figure 4:
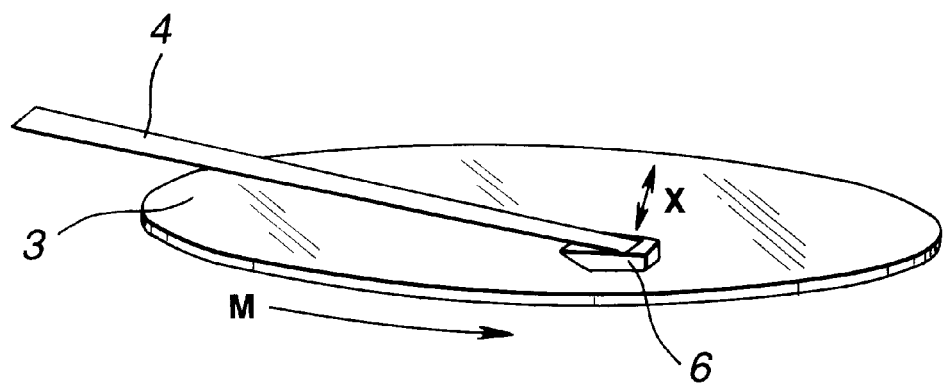
FIG. 4 is a sketch of the head slider included in the present invention, showing the motions thereof.

The magnetic disc drive 1 having the above-mentioned configuration records/reproduces information signal as will be described below with reference to FIG. 4. FIG. 4 is a sketch showing the motion of the head slider 6 of the present invention when recording/reproducing information signal into/from the magnetic disc 3.

In the magnetic disc drive 1 having the above configuration, when the spindle motor 9 is driven, the magnetic disc 3 spins at a constant angular velocity. When the voice coil 5 is supplied with an external current, the arm 4 pivots about the vertical shaft 4a under the effect of a force developed due to a magnetic field of the magnet 7c and the current flowing through the voice coil 5.

Thus, as the magnetic disc 3 spins in the direction of an arrow M in FIG. 4, the head slider 6 installed at the other end of the arm 4 moves substantially radially of the magnetic disc 3 in the direction of an arrow X in FIG. 4 while floating and running over the magnetic disc 3. Therefore, the magnetic head 8 installed on the head slider 6 makes a seek with respect to the magnetic disc 3 for recording/reproduction of information signal into/from a predetermined recording track on the magnetic disc 3.

Figure 5:
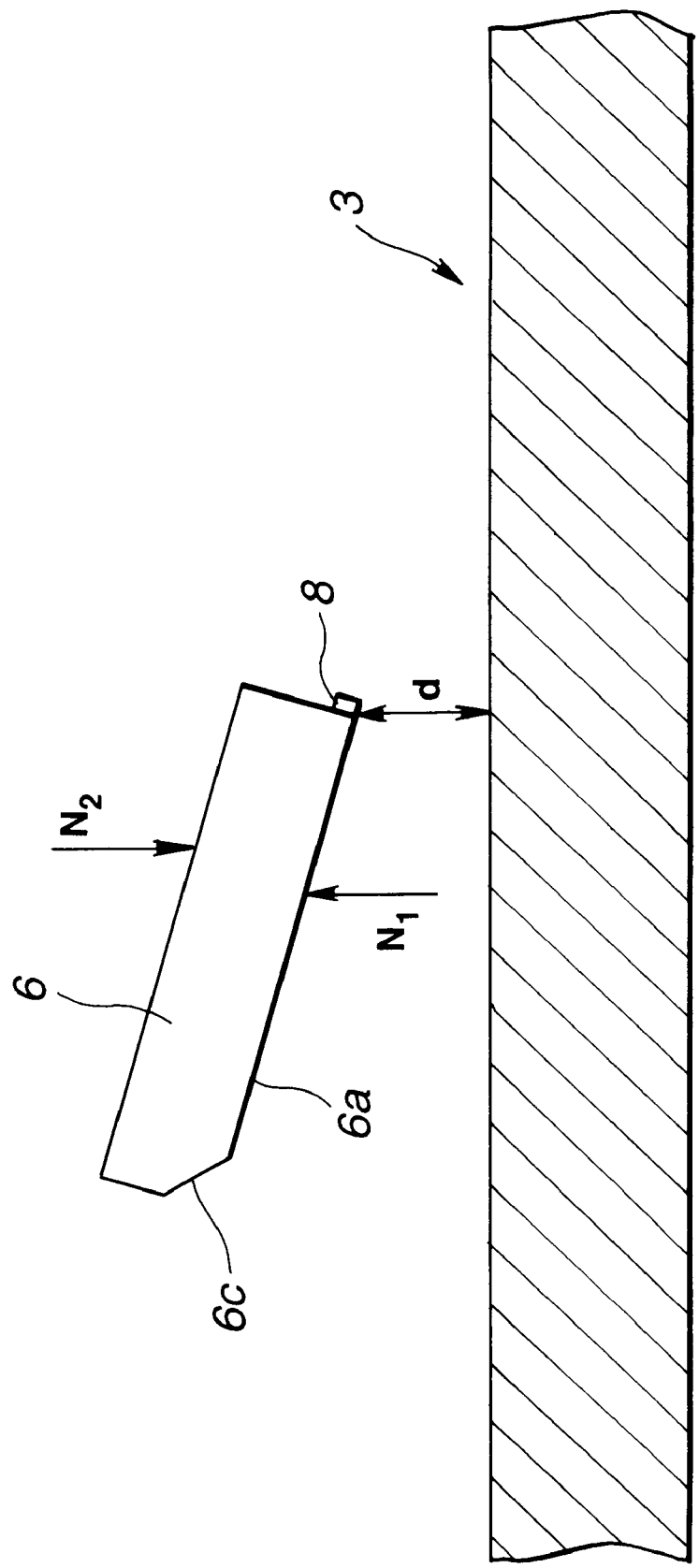
FIG. 5 is a sketch of an magnetic disc of the present invention, showing the motions thereof for information read and write.

At this time, the head slider 6 runs while floating as will be described below. FIG. 5 is a sketch showing how the head slider 6 floats over the magnetic disc 3 when the magnetic head 8 records/reproduces information into/from the magnetic disc 3.

As shown in FIG. 5, when the head slider 6 comes near the surface of the spinning magnetic disc 3, it will be given a floatation $N_1$ by an air flowing into between the rails 6a and 6b and the surface of the magnetic disc 3 as the magnetic disc 3 spins. The floatation $N_1$ is a load carrying capacity the air flow gives to the head slider 6.

When the head slider 6 floats to a height d over the surface of the magnetic disc 3 for recording/reproduction of information into/from the magnetic disc 3, the floatation $N_1$ is balanced with a weight $N_2$ of the head slider 6.

Note that when the floatation $N_1$ is balanced with the weight $N_2$ of the head slider 6, for example, during information reading/reproduction, the magnetic head 8 may be in contact with the magnetic disc 3. At this time, since the balance is attained between the floatation $N_1$ and the weight $N_2$ of the head slider 6, no vertical drag is applied from the magnetic disc 3 to the magnetic head 8 and thus the friction between the magnetic head 8 and the surface of the magnetic disc 3 can be made zero. Therefore, the friction between the magnetic head 8 and magnetic disc 3 can be eliminated while the magnetic head 8 is in contact with the surface of the magnetic disc 3.

Figure 6:
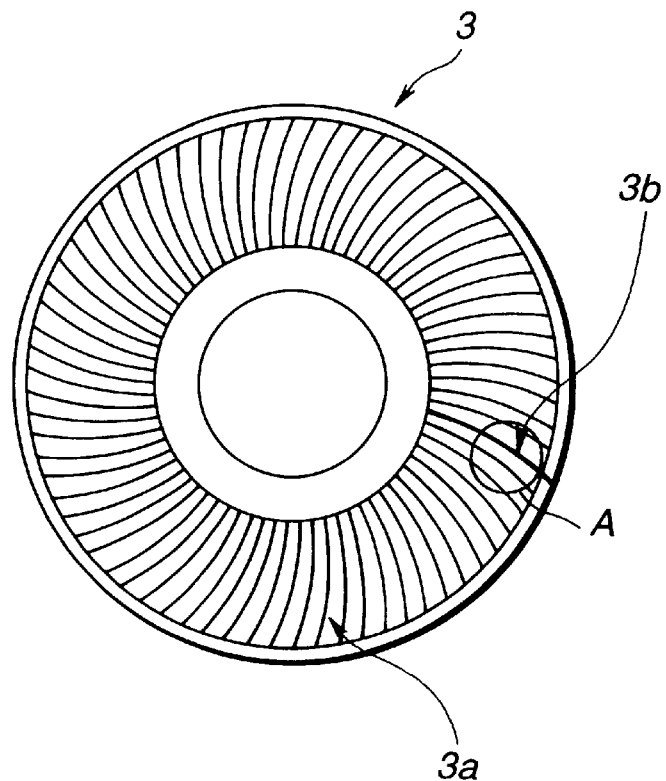
FIG. 6 is a plan view of an example of the magnetic disc according to the present invention.
Figure 7:
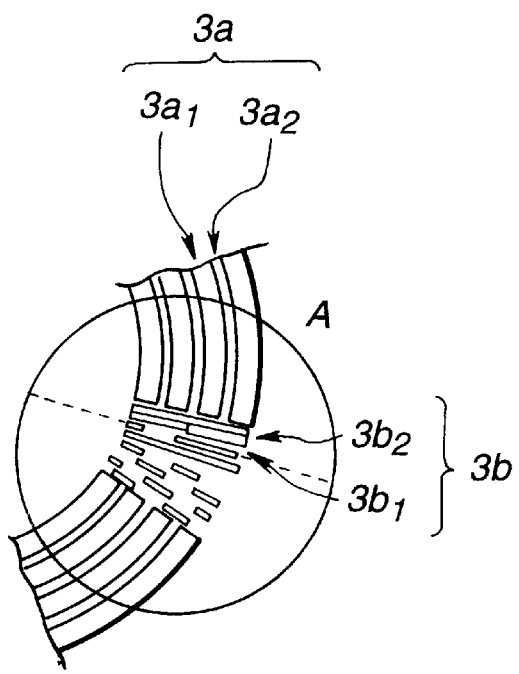
FIG. 7 is a plan view showing a range A in FIG. 6 as enlarged in scale.
Figure 8:
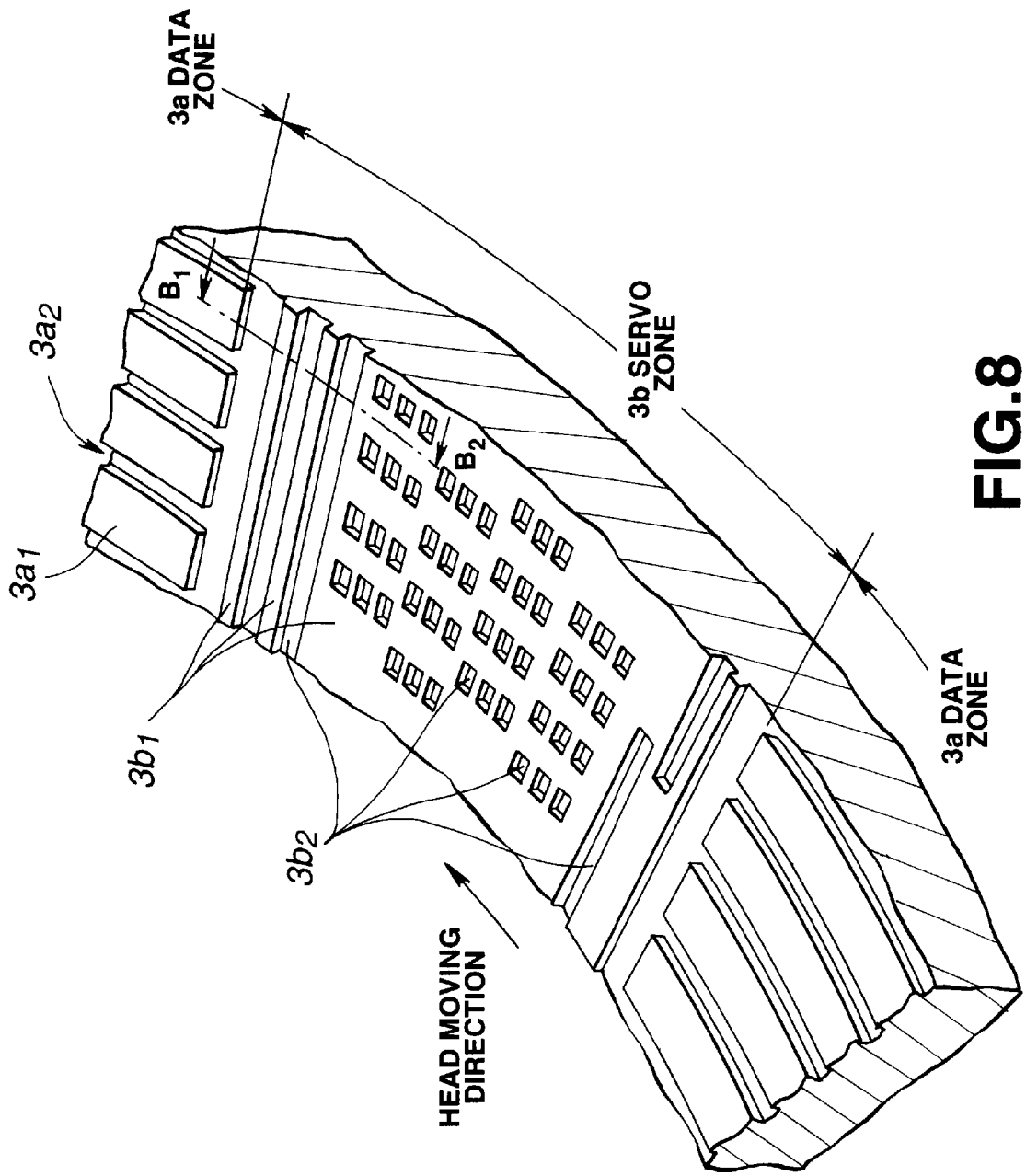
FIG. 8 is a perspective view of the magnetic disc of the present invention, showing the data and servo zones as enlarged in scale.
Figure 9:
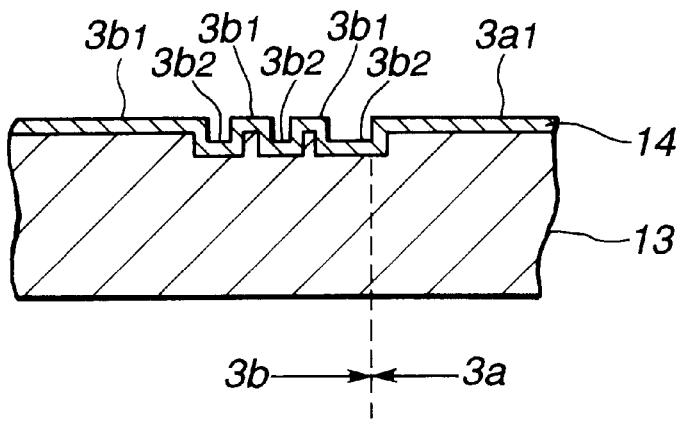
FIG. 9 is a sectional view of the magnetic disc taken along the line B1–B2 in FIG. 8.

Next, the magnetic disc according to the present invention, usable in the aforementioned magnetic disc drive 1, will be described concerning its configuration. FIG. 6 is a plan view of an example of the magnetic disc according to the present invention. FIG. 7 is a plan view showing in detail a range A in the magnetic disc shown in FIG. 6. FIG. 8 is a perspective view showing the boundary between the servo and data zones. FIG. 9 is a sectional view taken along the line $B_1$–$B_2$ in FIG. 8.

The magnetic disc 3 comprises substrate 13 made of a synthetic resin, glass or aluminum, for example. The substrate 13 has formed lands and grooves corresponding to data zones 3a and servo zones 3b, respectively. A magnetic film 14 is formed on the lands and grooves. The servo zones 3b are formed substantially radially of the center of the magnetic disc 3 as shown in FIG. 6, for example, to appear at every predetermined interval during information recording/reproduction.

The area ratio between the land and groove in the data and servo zones 3a and 3b will be referred to as "LGR (=Land-Groove Ratio)" hereinbelow.

As shown in FIGS. 7, 8 and 9, the data zone 3a consists of a land $3a_1$, for a recording track on which an arbitrary information signal is recorded and a groove $3a_2$ for a guard band which distinguishes the neighboring recording tracks. Note that the lands $3a_1$ and grooves $3a_2$ may be formed in parallel to the running direction of the head slider 6, namely, to the track direction. For formation of a spiral recording track, for example, the lands 3a1 and grooves $3a_2$ are formed spirally along the recording track. It should also be noted that the lands $3a_1$ may be formed continuous circumferentially or segmented to such an extent that the running of the head slider 6 will not be adversely affected.

More particularly, the LGR in the data zone 3a of the magnetic disc 3 according to the present invention is larger than 5.5. On the other hand, the conventional magnetic disc 200 has an LGR in the data zone of about 1 to 2. Namely, it can be said that the data zone 3a on the magnetic disc 3 according to the present invention has a rather large LGR.

On the other hand, lands $3b_1$ and grooves $3b_2$ are also formed on the surface of the servo zone 3b as shown in FIGS. 7 and 8.

More particularly, in the servo zone 3b on the magnetic disc 3 according to the present invention, the lands $3b_1$ form a reference plane and the grooves $3b_2$ correspond to control signals including servo signal as shown in FIGS. 7, 8 and 9. In the servo zone 3b, the lands $3b_1$ and grooves $3b_2$ are magnetized to have opposite polarities for recording control signals.

In the servo zone 400 with the servo pits of the conventional magnetic disc 200, however, the lands 400a are formed for control signals and grooves 400b are formed to provide a reference plane. The servo zone has an LGR of 1 or less.

On the other hand, the grooves $3b_2$ are formed for control signals in the servo zone 3b of the magnetic disc 3 according to the present invention. Thus, the LGR of the servo zone 3b is a reciprocal of the LGR in the servo zone 400 on the conventional magnetic disc 200 in which the lands 400a are formed for control signals. The LGR in the servo zone 3b is considerably larger than that in the servo zone 400. Namely, the land $3b_1$ is rather larger in area than the groove $3b_2$ in the servo zone 3b.

In the servo zone 3b of the magnetic disc 3 according to the present invention, the grooves $3b_2$ are formed for control signals and the land $3b_1$ is larger in area than the groove $3b_2$. Thus, the area of the groove which would cause the floating height of the head slider to decrease is made so small that the variation of floating height of the head slider passing over the zone, more particularly, reduction of the floating height, can be minimized. Thus, a more stable recording/reproduction can be realized.

To limit the variation of floating height of the head slider 6, the head slider 6 should preferably be applied with a substantially same floatation in the data zone 3a and servo zone 3b.

Figure 10:
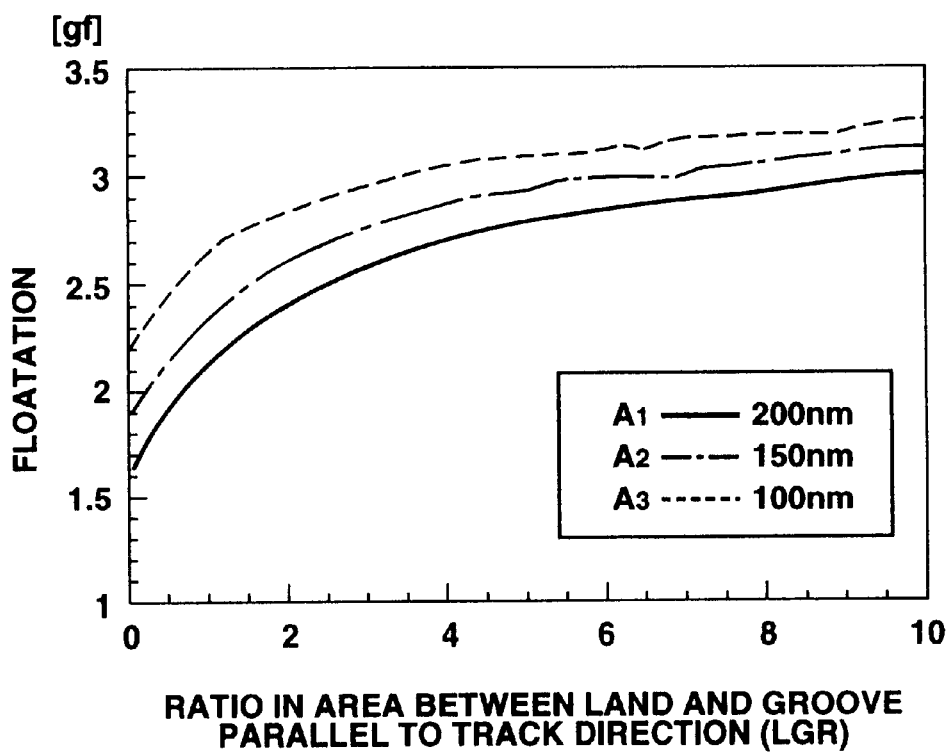
FIG. 10 is a graph showing the relation between LGR (land-groove ratio) and a floatation applied to the head slider in the magnetic disc in which lands and grooves are formed in parallel to the track direction.

FIG. 10 graphically shows the relation between a floatation applied to the head slider and an LGR at the lands and grooves parallel to the track direction. The lands and grooves parallel to the track direction are equivalent to those formed in the data zone. In FIG. 10, a solid line A1 indicates a relation between the floatation and LGR when the groove is 200 nm deep, a chain line A2 indicates a relation when the groove is 150 nm deep, and a dashed line A3 indicates a relation when the groove is 100 nm deep.

Figure 11:
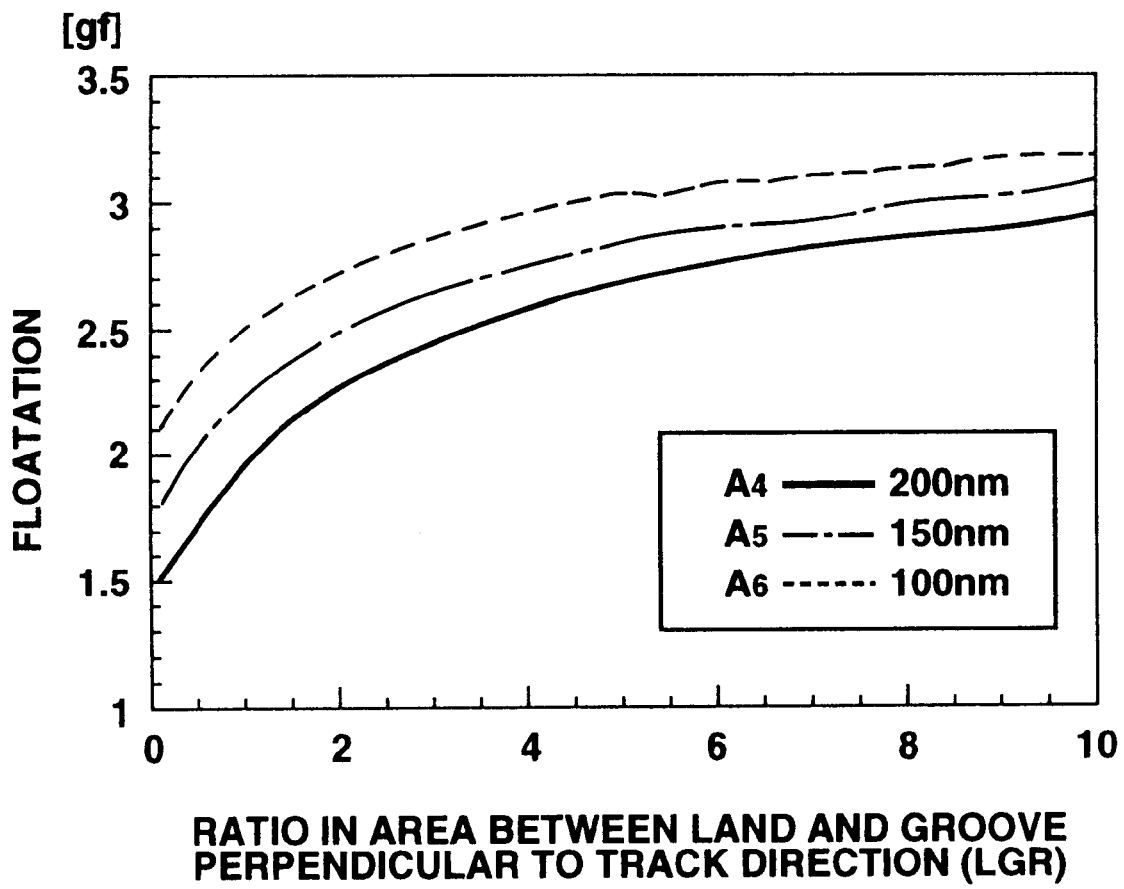
FIG. 11 is a graph showing the relation between LGR (land-groove ratio) and a floatation applied to the head slider in the magnetic disc in which lands and grooves are formed perpendicularly to the track direction.

FIG. 11 graphically shows the relation between a floatation applied to the head slider and an LGR at the lands and grooves substantially perpendicular to the track direction. The lands and grooves perpendicular to the track direction are equivalent to those formed in the data zone. In FIG. 11, a solid line A4 indicates a relation between the floatation and LGR when the groove is 200 nm deep, a chain line A5 indicates a relation when the groove is 150 nm deep, and a dashed line A6 indicates a relation when the groove is 100 nm deep.

Note that the variation of floating height of the head slider passing over the servo zone is analyzed by the static analysis and the floatation applied to the head slider is calculated by the average void theory disclosed in the paper "Averaged Reynolde Equation Extended to Gas Lubrication Possessing Surface Roughness in the Slip Flow Regime: Approximate Method and Confirmation Experiments"(ASME Journal of Tribology, Vol. 111, 1989, pp. 495–503, Mitsuya). Briefly, the average void theory is such that the floatation applied to the head slider varies depending upon the direction and depth of the surface roughness even when the ratio in area between the land and groove is same.

Figure 1:
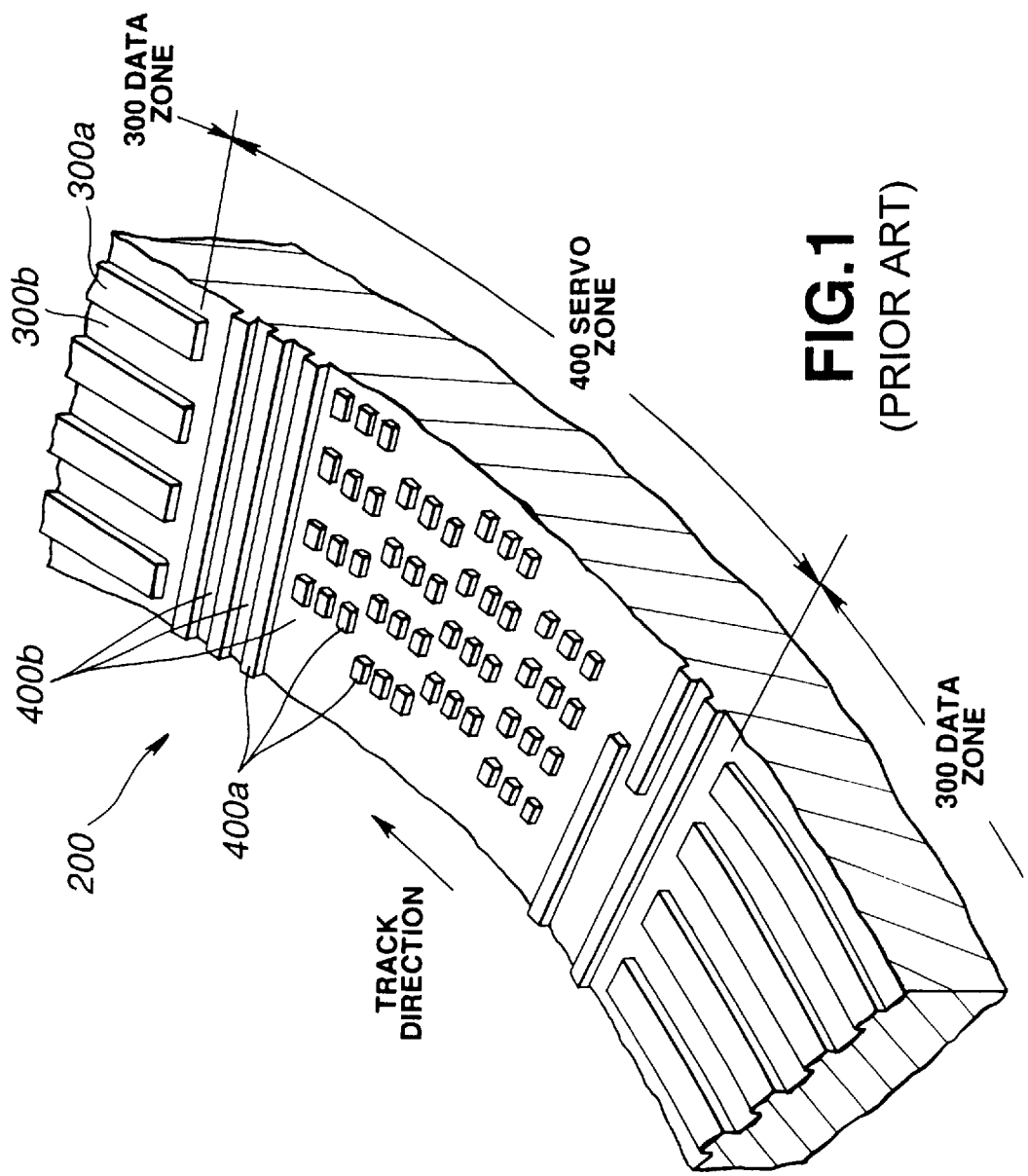
FIG. 1 is a perspective view of an conventional magnetic disc in which servo pits are formed in the servo zone.

In the conventional magnetic disc 200 with the servo pits shown in FIG. 1, the lands 400a are formed in the servo zone correspondingly to control signals, the LGR in the servo zone is 1 or less and LGR in the data zone is on the order of 1 to 2.

Therefore, to limit the variation of floating height, the conventional magnetic disc 200 is designed to have a substantially same floatation applied to the head slider in the data and servo zones both having a small LGR.

However, the floatation applied to the head slider varies more in a zone with a small LGR than in a zone with a large LGR as seen from FIGS. 10 and 11. Thus, a small difference in LGR between the servo and data zones cause a large difference in floatation in a zone with a small LGR, resulting in a large variation of floating height. Namely, the margin of LGR for the floatation is small in the zone of small LGR.

Therefore, the conventional magnetic disc 200 is disadvantageous in that since the LGR margin cannot be large for the floatation, a high precision cannot be attained in producing a magnetic disc having a predetermined LGR. That is, the conventional magnetic disc cannot be mass produced.

Normally, the molding stamper for the magnetic disc 200 is prepared using a cutting machine. Therefore, an LGR for a data zone can only be set discretely according to a setting of the cutting machine. For the conventional magnetic disc 200, it is almost impossible to attain a completely same floatation in both the servo and data zones and also it is practically difficult to completely inhibit the variation of floating height.

On the contrary, since the magnetic disc 3 according to the present invention has formed in the servo zone 3b grooves for control signals, the LGR in the servo zone 3b is large. In the magnetic disc 3 of the present invention, the floatation applied to the had slider 6 in the servo zone 3b is substantially same as that to the head slider 6 in the data zone 3a in order to limit the variation of floating height of the head slider 6.

When the servo zone 3b of the magnetic disc 3 according to the present invention has a large LGR, the floatation applied to the head slider 6 in the servo zone 3b is substantially same as that to the head slider 6 in the data zone 3a, resulting in a large LGR in the data zone 3a as well.

As shown in FIGS. 10 and 11, the variation of floating height of the head slider 6 is small in a zone with a large LGR, a large LGR margin can be taken against the floatation. Therefore, the LGR margin can be set for the data zone 3a in the magnetic disc 3 of the present invention. More particularly, the LGR in the data zone 3a of the magnetic disc 3 is 5.5 or more.

That is, the LGR in the data zone 3a of the magnetic disc 3 according to the present invention may be 5.5 or more, so that a wire large can be set. Therefore, the magnetic disc 3 of the present invention can be produced with a high productivity and reduced costs.

The magnetic disc 3 of the present invention is designed so that a difference between a quotient resulted from division of a floatation applied to the head slider 6 in the data zone 3a by a weight of the head slider 6 and a quotient resulted from division of a floatation applied to the head slider 6 in the servo zone 3b by the head slider weight, is within a range of −0.05 to +0.05. Therefore, it is possible to limit the variation of floating height of the head slider 6 to less than ±10% as will be described later. Thus, a stable recording/reproduction can be attained with the magnetic disc 3 of the present invention.

Figure 12:
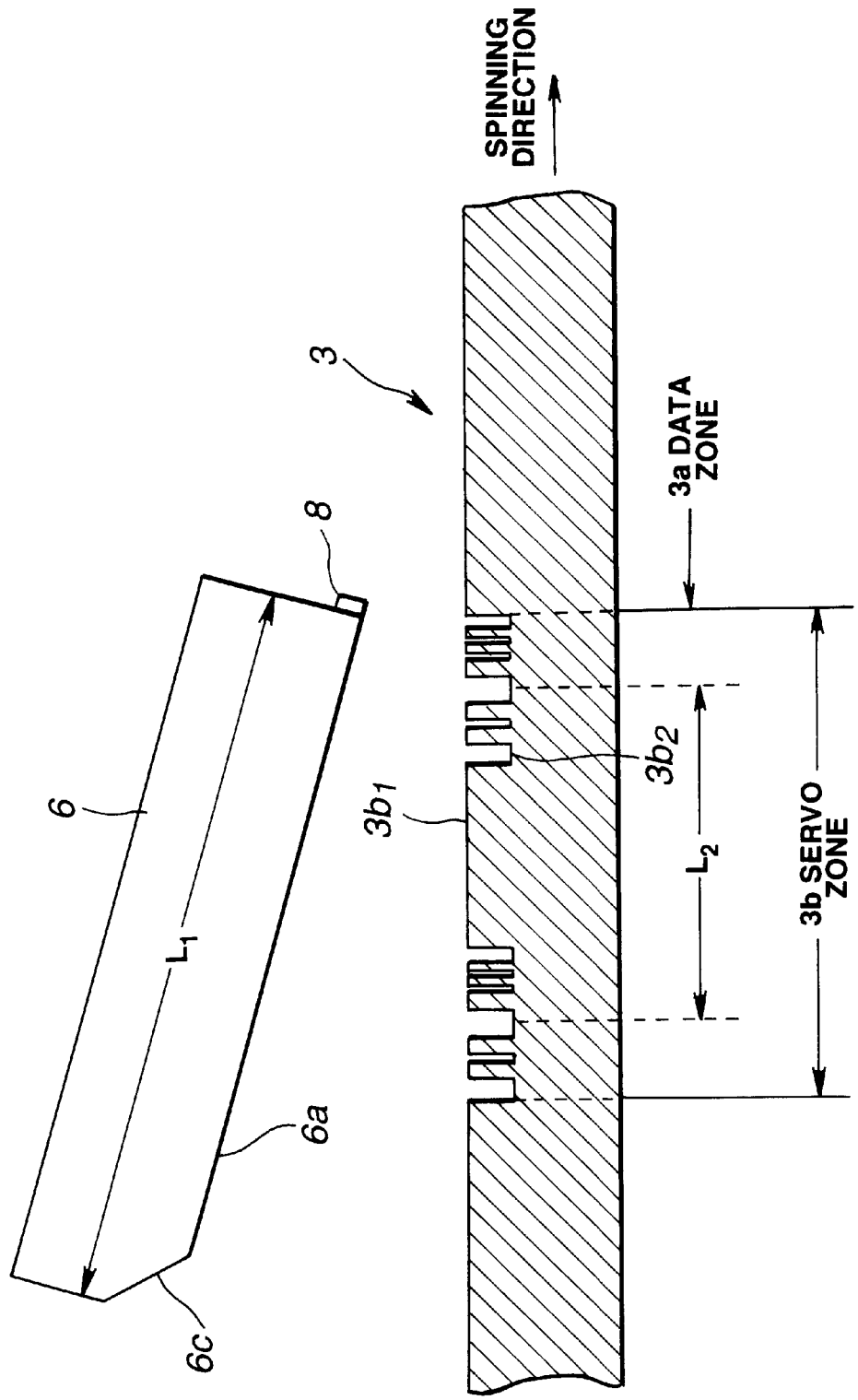
FIG. 12 is a fragmentary sectional view if the magnetic disc of the present invention, showing how the head slider floats over the magnetic disc.

Further, in the magnetic disc 3 of the present invention, the head slider 6 has a length $L_1$ in the recording track direction, which is larger than an interval $L_2$ between the servo zones 3b, as shown in FIG. 12. That is, at least two or more servo zones 3b are covered by the length $L_{1\pm\pm}$ of the head slider 6 floating over the magnetic disc 3.

Thus, the small interval between the servo zones 3b in the magnetic disc 3 of the present invention causes a waveform interference in the variation of floating height of the head slider 6 passing over the servo zone 3b, thereby permitting to reduce the apparent variation of floating height.

Namely, according to the present invention, the variation of floating height of the head slider 6 is reduced with the reduced interval between the servo zones 3b and the waveform interference, not through improvement of the pattern in the servo zone as in the conventional magnetic disc. Therefore, the magnetic disc 3 according to the present invention can be designed with a higher degree of freedom.

Next, the process of manufacturing the magnetic disc 3 having the above-mentioned configuration using the optical technology will be described in detail herebelow. FIGS. 13 to 20 are sketches for explanation of the processes of manufacturing the magnetic disc 3 of the present invention.

Figure 13:
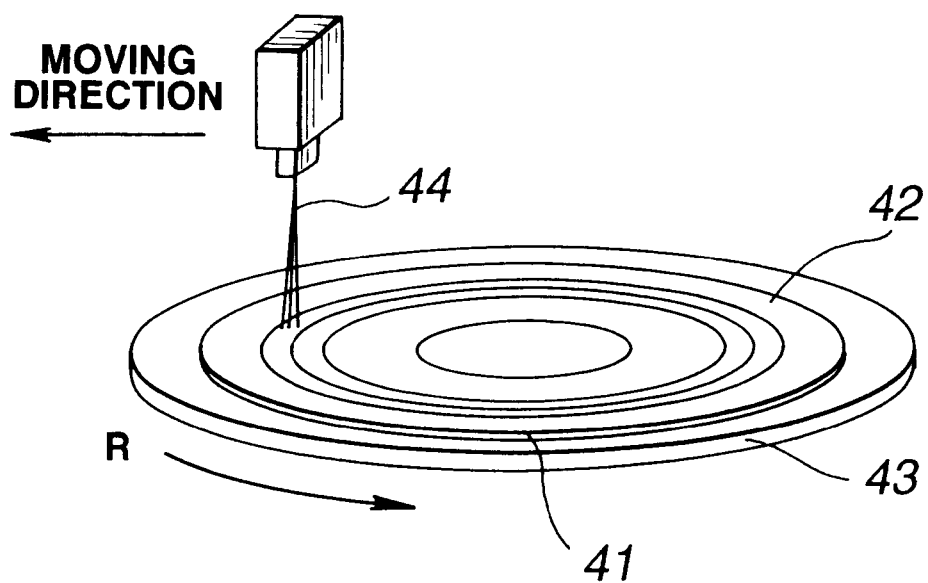
FIG. 13 is a sketch of the laser exposure process in manufacture of the magnetic disc of the present invention.

First, a photoresist 42 is applied to the surface of a glass substrate 41 as shown in FIG. 13. The glass substrate 41 coated with the photoresist 42 is placed on a turntable 43. The turntable 43 is rotated in the direction of arrow R in FIG. 13 and a laser light 44 is irradiated onto only a portion of the photoresist 42 where grooves are to be formed to cut a pattern.

Figure 14:
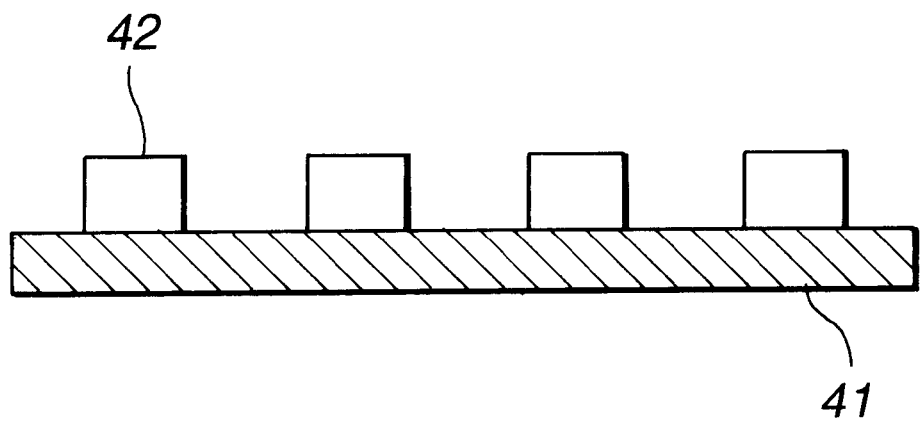
FIG. 14 is a sketch of the development process in manufacture of the magnetic disc of the present invention.

After the glass substrate 41 is exposed to the laser light 44, the photoresist 42 is developed to remove the exposed portion thereof as shown in FIG. 14.

Figure 15:
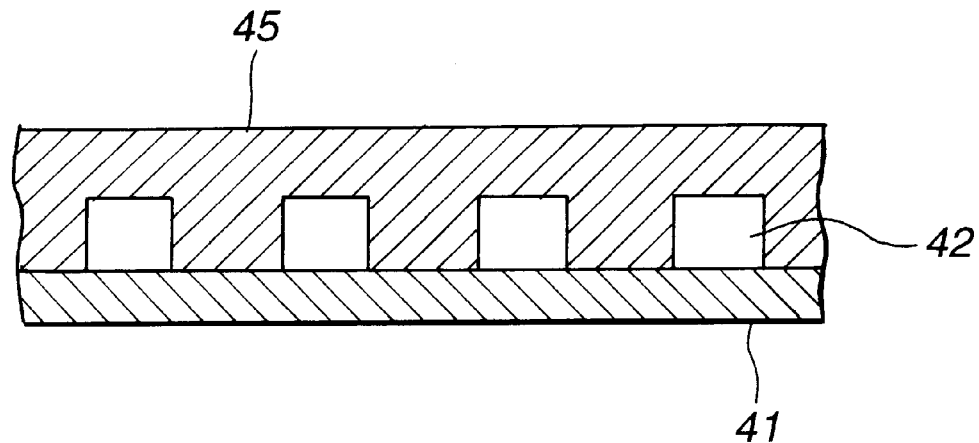
FIG. 15 is a sketch of the nickel plating process in manufacture of the magnetic disc of the present invention.
Figure 16:
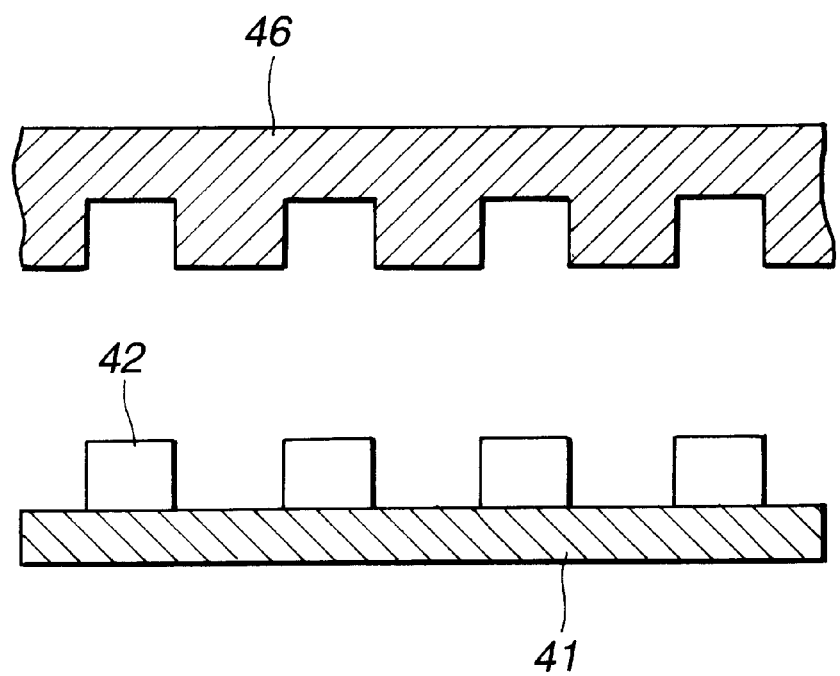
FIG. 16 is a sketch of the stamper production process in manufacture of the magnetic disc of the present invention.

Then, the surface of the glass substrate 41 from which the exposed portion of the photoresist 42 has been removed is plated with nickel 45 as shown in FIG. 15. The nickel 45 is separated from the glass substrate 41 and used as a stamper 46 as shown in FIG. 16.

Figure 17:
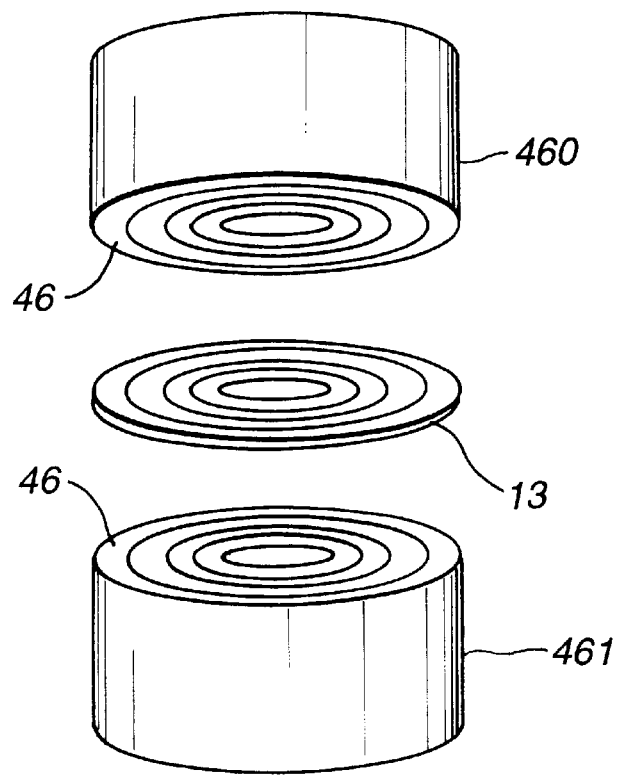
FIG. 17 is a sketch of the substrate molding process in manufacture of the magnetic disc of the present invention.
Figure 18:
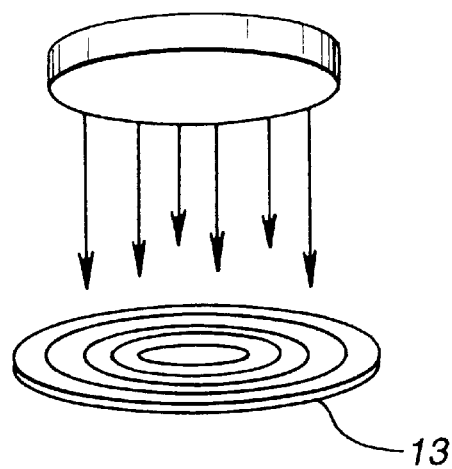
FIG. 18 is a sketch of the film forming process in manufacture of the magnetic disc of the present invention.
Figure 19:
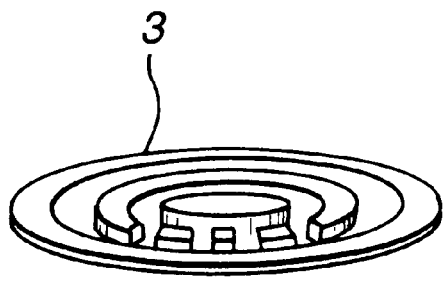
FIG. 19 is a sketch of the magnetic disc produced through the processes shown in FIGS. 13 to 18.

Then, the stamper 46 is installed on each of molds 460 and 461 as shown in FIG. 17 to mold a substrate disc 13. As shown in FIG. 18, a magnetic film 14 is formed on the surface of the substrate disc 13 by sputtering or the like method, to produce the magnetic disc 3 in FIG. 19.

Figure 20:
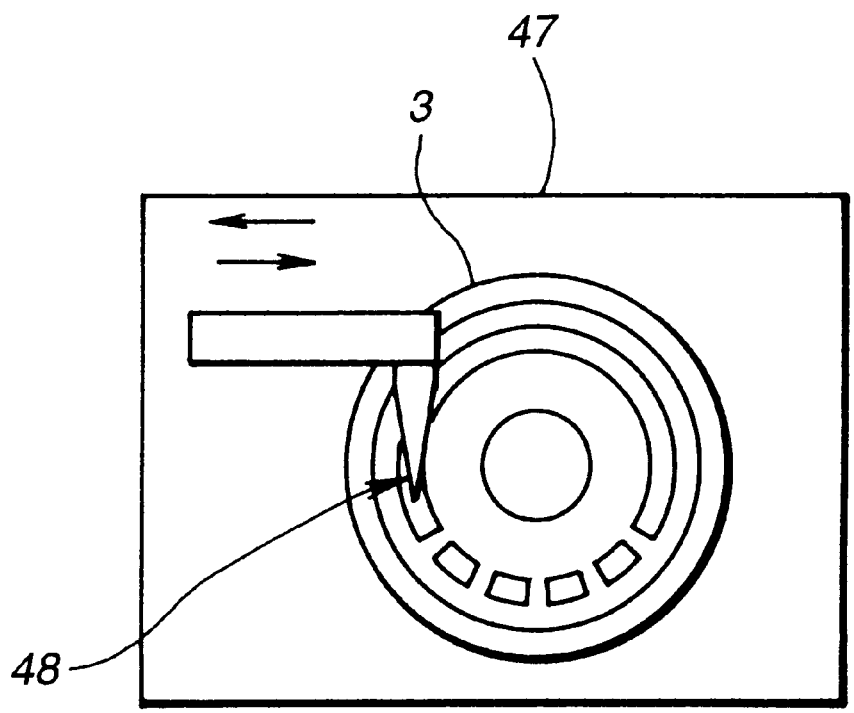
FIG. 20 is a sketch of an example of the polarizer or magnetizer used for magnetization of the magnetic disc shown in FIG. 19.

The magnetic disc 3 is polarized as will be described below. FIG. 20 is a sketch of a polarizer 47, and FIGS. 21 and 22 are also sketches showing the processes of polarizing the magnetic disc 3.

Figure 21:
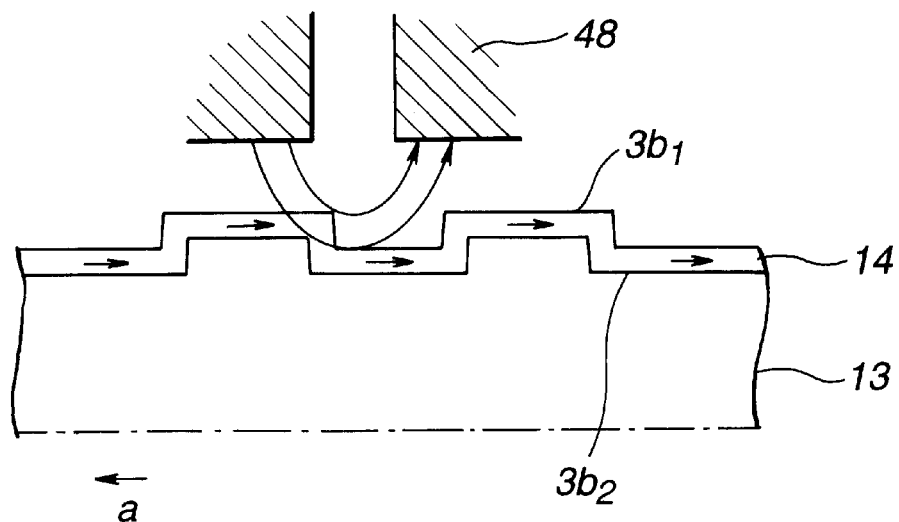
FIG. 21 is a sketch of the first magnetizing process conducted by the magnetizer shown in FIG. 20.
Figure 22:
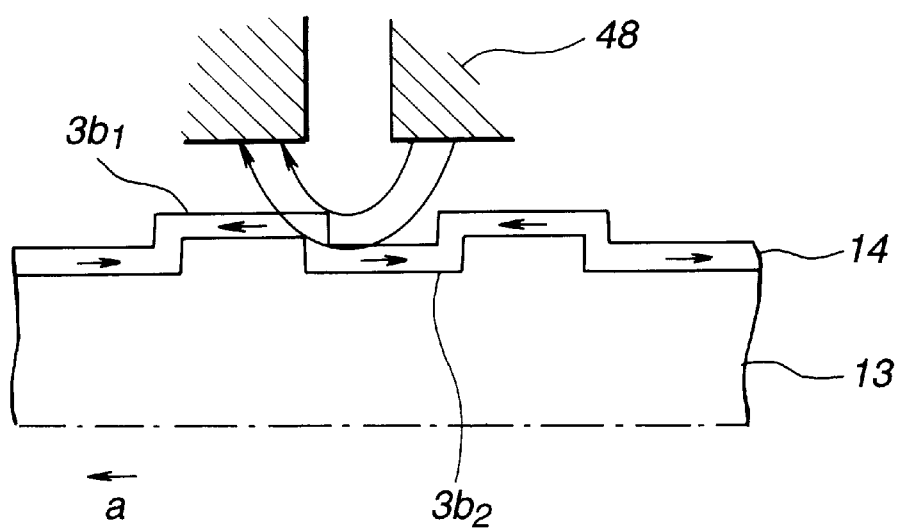
FIG. 22 is a sketch of the second magnetizing process conducted by the magnetizer shown in FIG. 20.

First, the magnetic disc 3 is set on the polarizer 47 as shown in FIG. 20 and rotated in the direction of arrow a as shown in FIG. 21.

Then, while a polarizing magnetic head 48 is being supplied with a first DC current, it is moved radially of the magnetic disc 3 at a predetermined track pitch to magnetize all the lands and grooves on the magnetic film 14 in a same direction, as will be seen from FIG. 21.

After that, while the polarizing magnetic head 48 is being supplied with a second DC current having an opposite polarity to that of the first DC current and smaller than the first DC current, it is moved radially of the magnetic disc 3 at the predetermined track pitch to magnetize only the lands of the magnetic film 14 in an opposite direction of that in which all the lands and grooves have been magnetized as in the above. This is shown in FIG. 22. At this time, the direction in which the groove $3b_2$ formed corresponding to a control signal is opposite to that in which the land $3b_1$ formed as a space to distinguish control signals from each other.

EXAMPLES

Examples of the present invention to which however the present invention is not limited will be described in detail hereinbelow with reference to the accompanying drawings.

Example 1

To know whether it is possible to have a large LGR margin in the data zone, a following glass disc was prepared of which a portion of the servo zone corresponding to a control signal was formed as a groove to provide a large LGR and which was designed for a substantially same floatation to be applied to the head slider in both the servo and data zones.

The glass disc had data zones formed substantially concentrically and 224 servo zones formed radially thereof along the seek orbit of the head slider. A smooth surface area located at a radius of 30.2 mm and having a predetermined radial width was formed on the glass disc.

The servo zone on the glass disc used in this example had formed thereon grooves corresponding to control signals. Thus, the servo zone on the glass disc had a larger LGR than the servo zone on the conventional magnetic disc in which lands are formed correspondingly to control signals.

Figure 23:
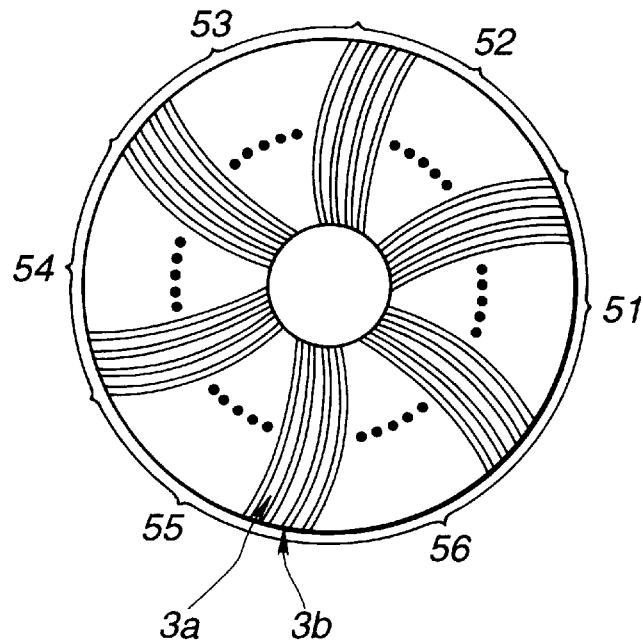
FIG. 23 is a plan view of a glass disc used in an example 1.

The data zone of the glass disc was divided radially into six areas 51, 52, 53, 54, 55 and 56 as shown in FIG. 23, whose are different in LGR from each other. The glass disc was disposed so that when the head slider turned around the glass disc, it would have passed all the areas in the data zone.

Each of the areas in the data zone had an LGR as follows. The first area 51 had an LGR of 1.7, the second area 52 had an LGR of 2.2, the third area 53 had an LGR of 3.0, the fourth area 54 had an LGR of 4.5, the fifth area 55 had an LGR of 7.0, and the LGR of the sixth area 56 was infinite, namely, it had a flat and smooth surface.

Note that all the grooves in the servo and data zones were about 200 nm deep and track pitch in the data zone is 3.2 $\mu$m in each area.

Therefore, when the head slider passes over the glass disc, the variation of floating height of the head slider can be measured in each of the areas since the LGR in the servo zone is fixed and the LGR in the data zone varies from one area to another.

For preparation of this glass disc, a photoresist was first applied to the surface of the glass disc, and exposed to a laser light defining a pattern of each of the servo and data zones based on a cutting data.

Next, the photoresist was developed to produce a mask pattern. Then, the glass disc was subjected to a reactive ion etching (RIE) to form the above-mentioned servo and data zones of 15.5 to 35.0 mm in radius. No magnetic film was formed on the glass disc.

The glass disc was used to evaluate the relation between the LGR in the data zone and variation of floating height of the head slider.

The head slider used in this experiment was an ordinary 50% nano slider 2.0 mm long and 1.6 mm wide. The head slider was a flat type comprising two 200 $\mu$m-wide rails tapered by cutting. The head slider weighed 3.5 gf.

First, the glass disc was spun at a speed of 4,000 rpm. A laser vibrometer was used to measure the floating height of the head slider in the smooth surface area located at a radius of 30.2 mm on the glass disc. The vibrometer measures a floating height of the head slider by differentiating a reference light irradiated onto the glass disc and a measuring light irradiated to the rear end of the head slider. The head slider floats about 50 nm when the head slider moves at a rate of 7 m/s in relation to a magnetic disc.

Figure 24:
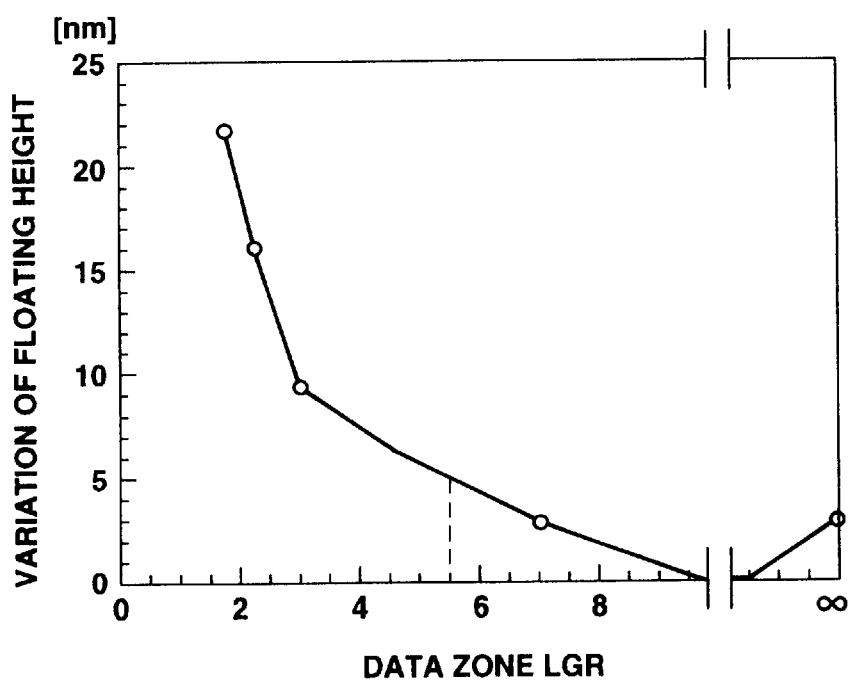
FIG. 24 is a graph showing the relation between LGR and variation of floatation in the data zone of the glass disc in the example 1.

The results of the measurement are shown in FIG. 24 in which the horizontal axis indicates LGR in the data zone while the vertical axis indicates variation of floating height of the head slider.

Normally, a variation of floating height of the head slider passing over the servo zone, which is within ±10% of the floating height, is within an allowable range in which the magnetic disc drive can normally operate in practice. Thus, the allowable variation of floating height may be said to be less than 10% of the floating height and less than 5 nm.

As revealed from the results of measurement shown in FIG. 24, when the LGR in the data zone is 5.5 or more, the variation of floating height will be less than 5 nm which is within the allowable range. Also, the variation of floating height will be less than 5 nm when the LGR in the data zone is infinite, that is, when the data zone is flat and smooth. Therefore, it was proved that the glass disc used in this experiment was allowed a very large margin for the LGR in the data zone when the LGR in the data zone in which the variation of floating height is within the allowable range is within a range of 5.5 to infinity.

As seen from the above description, the variation of floating height of the head slider can be limited when the floatation applied to the head slider in the data zone is substantially same as that applied to the head slider in the servo zone. The LGR in the servo zone of the glass disc used in this experiment is rather larger than that in the servo zone of the conventional magnetic disc. Thus, in the magnetic disc in this experiment the variation of floating height of the head slider is minimum when the LGR in the data zone is about 7 to 10.

As revealed from the foregoing, it can be attained by forming a groove-land pattern so that a portion corresponding to a control signal is concave while a reference plane lies in the top of a land that the land in the servo zone can be larger in area that the groove, namely, the LGR in the servo zone can be larger, and that the LGR margin of the data zone can be large for limiting to less than 5 nm the variation of floating height of the head slider passing over the servo zone.

Since the magnetic disc used in the aforementioned experiment assures a large LGR margin for the data zone, the present invention can provide a magnetic disc and magnetic disc drive suitable for mass production.

Comparative Example 1

For evaluation of the relation between the data zone LGR and variation of floating height of the head slider in the conventional magnetic disc with the servo pits formed therein, a glass disc was prepared as will be described below.

The glass disc had data zones formed substantially concentrically and 224 servo zones formed radially thereof along the seek orbit of the head slider. A smooth surface area located at a radius of 30.2 mm and having a predetermined radial width was formed on the glass disc.

The servo zone on the glass disc used in this comparative example 1 had formed thereon a groove-land pattern in which grooves correspond to control signals and the lands provide a reference plane. Also the glass disc had formed pits whose shape and height are similar to those in the servo pits pre-formed on the conventional magnetic disc 200. Thus, the servo zone on the glass disc had an LGR as small as about 1. The glass disc used in this comparative example 1 has no magnetic film formed thereon.

Similar to the glass disc shown in FIG. 23, the data zone of the glass disc was divided radially into six areas whose are different in LGR from each other. The glass disc was disposed so that when the head slider turned around the glass disc, it would have passed all the areas in the data zone.

Each of the areas in the data zone had an LGR as follows. The first area had an LGR of 0.2, the second area had an LGR of 0.5, the third area had an LGR of 1.0, the fourth area had an LGR of 1.7, the fifth area had an LGR of 7.0, and the LGR of the sixth area was infinite, namely, it had a flat and smooth surface.

Note that all the grooves in the servo and data zones were about 200 nm deep and track pitch in the data zone was 3.2 $\mu$m in each area.

Therefore, when the head slider passes over the glass disc, the variation of floating height of the head slider can be measured in each of the areas since the LGR in the servo zone is fixed and the LGR in the data zone varies from one area to another. Note that the glass disc used in this comparative example 1 was prepared similarly to the example 1 having been described in the foregoing.

The glass disc was used to evaluate the relation between the LGR in the data zone and variation of floating height of the head slider. The head slider used in this experiment was similar to that used in the example 1.

First, the glass disc was spun at a speed of 4,000 rpm. As in the experiment of the example 1, a laser vibrometer was used to measure the floating height of the head slider in the smooth surface area located at a radius of 30.2 mm on the glass disc.

Figure 25:
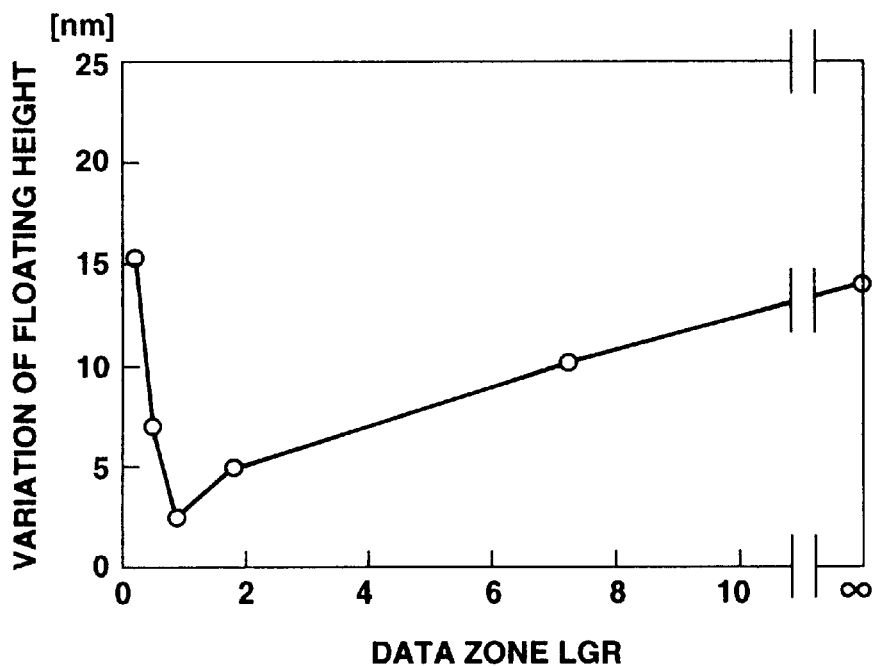
FIG. 25 is a graph showing the relation between LGR and variation of floatation in the data zone of the glass disc in a comparative example.

The results of the measurement are shown in FIG. 25 in which the horizontal axis indicates LGR in the data zone while the vertical axis indicates variation of floating height of the head slider.

As revealed from the results of measurement shown in FIG. 25, when the LGR in the data zone is limited to a range of about 0.6 to 2.0, the variation of floating height will be less than 5 nm which is within the allowable range. Since the floatation applied to the head slider varies largely in an area whose LGR is small as shown in FIGS. 10 and 11, the range of data zone LGR in which the variation of floating height of the head slider passing over the servo zone is limited to less than 5 nm included in the allowable range, is very limited.

As seen from a comparison between the example 1 and comparative example 1 having been described in the foregoing, the data zone LGR range in which the allowable range of the variation of floating height of the head slider is included can be wide, namely, the margin for the data zone LGR can be large, by forming, of the grooves and lands in the servo zone, a portion corresponding to a control signal as a groove and a reference plane as a land. Thus, the variation of floating height of the head slider can be limited more easily and effectively, thereby assuring a more stable recording and reproduction. Therefore, the present invention can provided a magnetic disc and magnetic disc drive suitable for mass production.

Next, the allowable range of the variation of floating height of the head slider and a corresponding floatation applied to the head slider was evaluated.

EXAMPLE 2

For evaluation of a practical range of the variation of head slider floating height and a corresponding range of floatation applied to the head slider in view of the recordability and reproducibility of the magnetic disc, a glass disc was prepared as will be described in the following.

The glass disc used in the example 2 had data zones concentrically formed and 64 servo zones formed radially along the seek orbit of the head slider. The glass disc in this example 2 had no magnetic film formed thereon. A smooth surface area located at a radius of 29.3 mm and having a predetermined radial width was formed on the glass disc.

The data zones were formed at a track pitch of 4.8 μm. The data zones had a fixed LGR of 2.0.

Each of the 64 servo zones had grooves perpendicular to the radius of the glass disc, not the servo pits as in the conventional magnetic disc. The data zone was divided into six areas different in LGR from each other as in the glass disc shown in FIG. 23. The glass disc was disposed so that when the head slider turned around the glass disc, it would have passed all the areas of the servo zone.

Each of the areas in the data zone had an LGR as follows. The first area had an LGR of 1.0, the second area had an LGR of 1.5, the third area had an LGR of 2.0, the fourth area had an LGR of 2.3, the fifth area had an LGR of 3.2, and the sixth area had an LGR of 3.8. All the grooves in both the servo and data zones were about 200 nm deep.

Therefore, when the head slider passes over the glass disc, the variation of floating height of the head slider can be measured in each of the areas since the LGR in the servo zone is fixed and the LGR in the data zone varies from one area to another.

The glass disc was used to evaluate the relation between the LGR in the data zone and variation of floating height of the head slider. The head slider used in this experiment was similar to that used in the example 1.

First, the glass disc was spun at a speed of 4,000 rpm. As in the experiment of the example 1, a laser vibrometer was used to measure the floating height of the head slider in the smooth surface area located at a radius of 29.3 mm on the glass disc. The results of the measurement are shown in FIG. 26 in which the horizontal axis indicates LGR in the data zone while the vertical axis indicates variation of floating height of the head slider.

Figure 26:
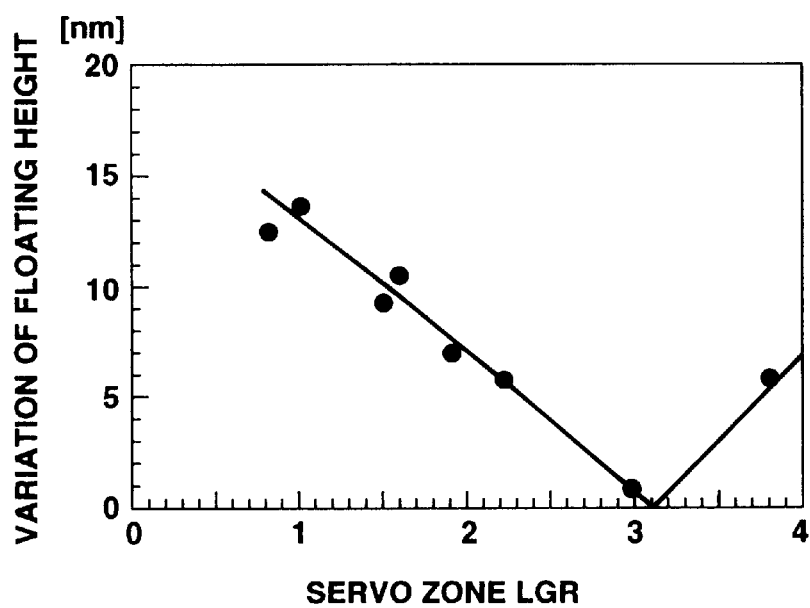
FIG. 26 is a graph showing the relation between LGR and variation of floatation in the servo zone.

As revealed from the results of measurement shown in FIG. 26, when the LGR in the servo zone is 3.2 while that of the data zone is 2.0, the variation of floating height of the head slider passing over the servo zone may be said to be nearly zero. Also, as shown in FIGS. 10 and 11, the floatation applied to the head slider when the data zone LGR is 2.0 can be said to be substantially same as that applied to the head slider when the servo zone LGR is 3.2.

The above shows that the nearly same floatation to the head slider in both the servo and data zones is effective for limitation of the variation of floating height. Also, it is also shown that a static analysis using the floatation to the head slider as a parameter can suitably be used for analysis of the variation of head slider floating height.

Next, a relation between the floatation and variation of head slider floating height was derived from the results shown in FIG. 26. The derived result is shown in FIG. 27 in which a normalized value of a quotient resulted from a division of the variation of floating height of the head slider passing over the servo zone by the floating height is indicated along the vertical axis and a normalized value of a quotient resulted from a division of the difference between the floatation applied to the head slider in the data zone and that in the servo zone by the weight of the head slider is indicated along the horizontal axis.

Figure 27:
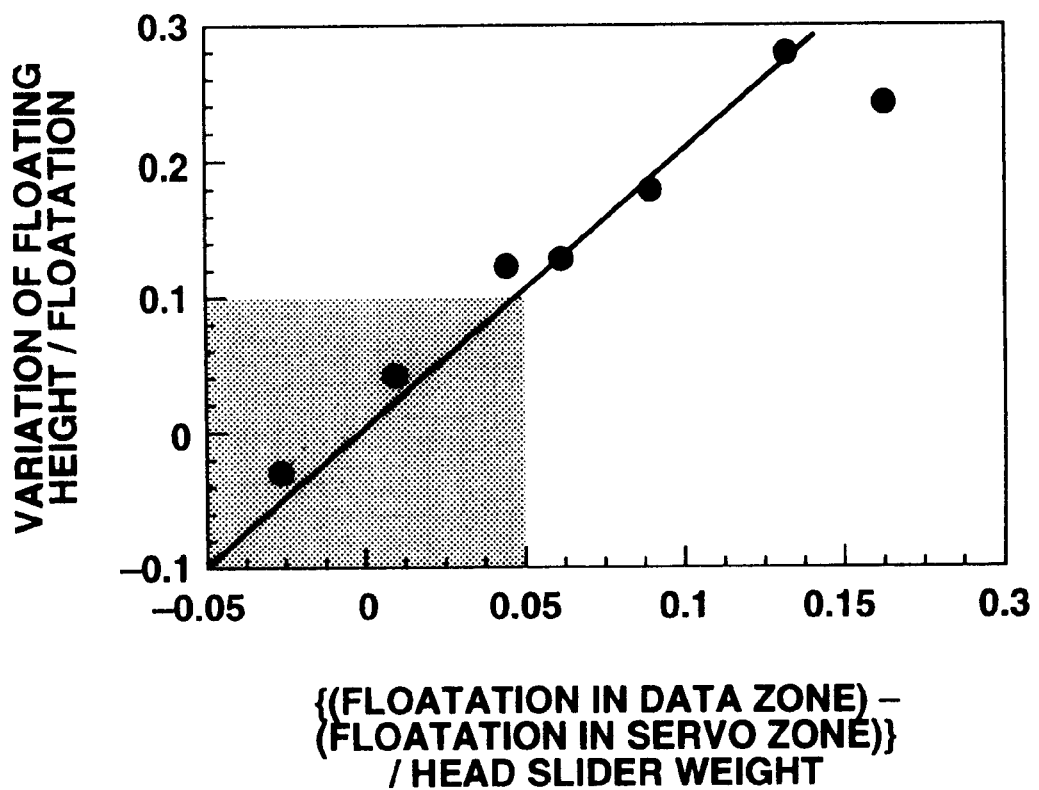
FIG. 27 is a graph showing the relation between the floatation difference normalized with the weight of the head slider and the variation of floatation normalized with the floatation.

As apparent from FIG. 27, the normalized variation of head slider floating height is generally proportional to the normalized floatation applied to the head slider. The straight line showing the relation passes by the origin of the graph in FIG. 27. A range of normalized floatation to the head slider which will implement a variation of head slider floating height with no practical problem can be determined from the graph shown in FIG. 27.

That is to say, since the practical range of variation of floating height is ±10% of the floating height, FIG. 27 will show an allowable range of a floatation normalized with a head slider weight is −0.05 to +0.05.

Therefore, the above results show that the floatation applied to the head slider in the servo and data zones, respectively, should be identical to each other in order to zero the variation of floating height of the head slider passing over the servo zone.

Also, it is shown that to limit the variation of floating height of the head slider passing over the servo zone to a practical extent, the range of a floatation normalized by the head slider weight should be ranged from −0.05 to +0.05.

The graph shown in FIG. 27 was generated based on the results, shown in FIG. 26, of the measurement of the variation of head slider floating height in a magnetic disc in which the data and servo zones has a small LGR. The magnetic disc showing the results of experiment in FIG. 26 had in the servo zone a pit pattern formed from simple grooves and lands, namely, it is an ordinary magnetic disc with pits formed in the servo zone thereof. The results shown in FIG. 27 are common to various types of magnetic disc, and so are applicable to the magnetic disc according to the present invention in which a portion corresponding to a control signal is formed as a groove.

As having been described in the foregoing, the lands formed in the control signal recording zone on the magnetic disc according to the present invention are smaller in area than grooves also formed therein, so that the grooves will less reduce the floating of the head slider in the control signal recording zone. Therefore, the variation of floating height of the head slider passing over the control signal recording zone can be minimized. The magnetic disc according to the present invention can thus have a stable recordability and/or reproducibility, and also assure a high reliability.

Also in the magnetic disc according to the present invention, a difference between a quotient resulted from division of a floatation applied to the head slider in the information recording zone by a head slider weight and a quotient resulted from division of a floatation applied to the head slider in the control signal recording zone by the head slider weight is limited to a range of −0.05 to +0.05. Thus the variation of head slider floating height can be minimized and the magnetic disc has a stable recordability and/or reproducibility.

Further in the magnetic disc according to the present invention, a control signal recording zone is formed at every predetermined interval along the recording track and the length of the head slider in the recording track direction is longer than the predetermined interval. So, the variation of floating height of the head slider passing over the control signal recording zone can be subjected to a waveform interference to effectively minimize the apparent variation of head slider floating height. Thus, the present invention can provide a stably recordable and/or reproducible, and highly reliable magnetic disc.

The minimization of the apparent variation of floating height by the waveform interference permits to more freely design a magnetic disc, different from the conventional method of designing a servo zone pattern, more easily manufacture the magnetic disc and realize a highly efficient mass production with reduced costs.

What is claimed is:

1. A magnetic disc recordable and/or reproducible by a magnetic disc recordable and/or reproducible by a magnetic head installed on a head slider designed to float at at least a part thereof owing to a floatation developed by an air flow between the head slider and the surface of the magnetic disc during recording and/or reproduction, having on a surface thereof:

an information recording zone in which groove-like grooves are formed along a recording track and arbitrary information signal is recorded at a land between the grooves; and a control signal recording zone in which grooves and lands corresponding to control signals including at least a servo signal are formed and magnetized to have opposite polarities to record the control signals;

each land in the control signal recording zone being larger in area than each groove in the zone.

2. The magnetic disc as set forth in claim 1, wherein the land in the information recording zone is 5.5 times or more larger in area than the groove in the zone.

3. The magnetic disc as set forth in claim 1, wherein in the information recording zone, a difference between a quotient resulted from division of a floatation applied to the head slider in the information recording zone by a head slider weight and a quotient resulted from division of a floatation applied to the head slider in the control signal recording zone by the head slider weight is within a range of −0.05 to +0.05.

4. The magnetic disc as set forth in claim 1, wherein the control signal recording zone is formed at a predetermined interval along the recording track; and the recording track-directional length of the head slider is larger than the predetermined interval.

5. A magnetic disc drive, comprising:

a magnetic disc;

a head slider designed to float at at least a part thereof owing to a floatation developed by an air flow between the head slider and the surface of the magnetic disc during recording and/or reproduction; and a magnetic head installed on the head slider to make recording and/or reproduction into/from the magnetic disc;

the magnetic disc having on a surface thereof:

an information recording zone in which groove-like grooves are formed along a recording track and arbitrary information signal is recorded at a land between the grooves; and a control signal recording zone in which grooves and lands corresponding to control signals including at least a servo signal are formed and magnetized to have opposite polarities to record the control signals;

each land in the control signal recording zone being larger in area than each groove in the zone.

6. The magnetic disc drive as set forth in claim 5, wherein the land in the information recording zone is 5.5 times or more larger in area than the groove in the zone.

7. The magnetic disc drive as set forth in claim 5, wherein in the information recording zone, a difference between a quotient resulted from division of a floatation applied to the head slider in the information recording zone by a head slider weight and a quotient resulted from division of a floatation applied to the head slider in the control signal recording zone by the head slider weight is within a range of −0.05 to +0.05.

8. The magnetic disc drive as set forth in claim 5, wherein the control signal recording zone is formed at a predetermined interval along the recording track; and the recording track-directional length of the head slider is larger than the predetermined interval.

* * * * *